United States Patent [19]

McNally et al.

[11] Patent Number: 4,808,319
[45] Date of Patent: Feb. 28, 1989

[54] METHOD FOR REMOVING A SLIME DEPOSIT FROM PACKING MATERIAL INSIDE A TOWER

[75] Inventors: Robert G. McNally, Auburn; Thomas F. Klumpp, Bay City, both of Mich.

[73] Assignee: The Dow Chemical Company, Midland, Mich.

[21] Appl. No.: 192,278

[22] Filed: May 9, 1988

[51] Int. Cl.$^4$ .......................... B01D 3/26; C02F 1/04
[52] U.S. Cl. .......................... 210/741; 55/90; 134/19; 203/4; 210/764; 210/766; 210/774
[58] Field of Search ............ 210/747, 750, 752–756, 210/758–761, 764, 765, 766, 774, 793, 794, 805, 741; 55/21, 46, 48, 52, 88, 89, 96, 90; 261/95, DIG. 72; 134/19, 22.18, 30, 42; 203/4, 49

[56] References Cited

U.S. PATENT DOCUMENTS

| | | | |
|---|---|---|---|
| 3,947,258 | 3/1976 | Decker | 55/88 |
| 4,032,443 | 6/1977 | Ross | 210/793 X |
| 4,279,704 | 7/1981 | Noble, Sr. et al. | 203/4 X |
| 4,297,224 | 10/1981 | Macchiarolo et al. | 210/755 |
| 4,312,761 | 1/1982 | Gitchel | 210/747 |
| 4,393,037 | 7/1983 | Delaney et al. | 210/764 X |
| 4,588,506 | 5/1986 | Raymond et al. | 210/747 X |

Primary Examiner—Tom Wyse
Attorney, Agent, or Firm—V. Dean Clausen

[57] ABSTRACT

Air stripping is a common technique used to remove organic impurities from water found in underground aquifers. When this technique is used, bacteria already present in the underground water, and bacteria and oxygen introduced into the water by the incoming air, cause slime deposits to form on the packing material inside the stripping towers. The slime will build up to a point where the pressure drop through the column will increase and the air flow will decrease, which causes the stripping efficiency of the column to drop considerably. In the practice of this invention, the decontaminated water is heated to a temperature of from about 175° F. to 190° F. and recycled through the stripping towers. As the hot water passes through the packing section in each tower, it destroys the slime material and removes it from the packing material.

6 Claims, 1 Drawing Sheet

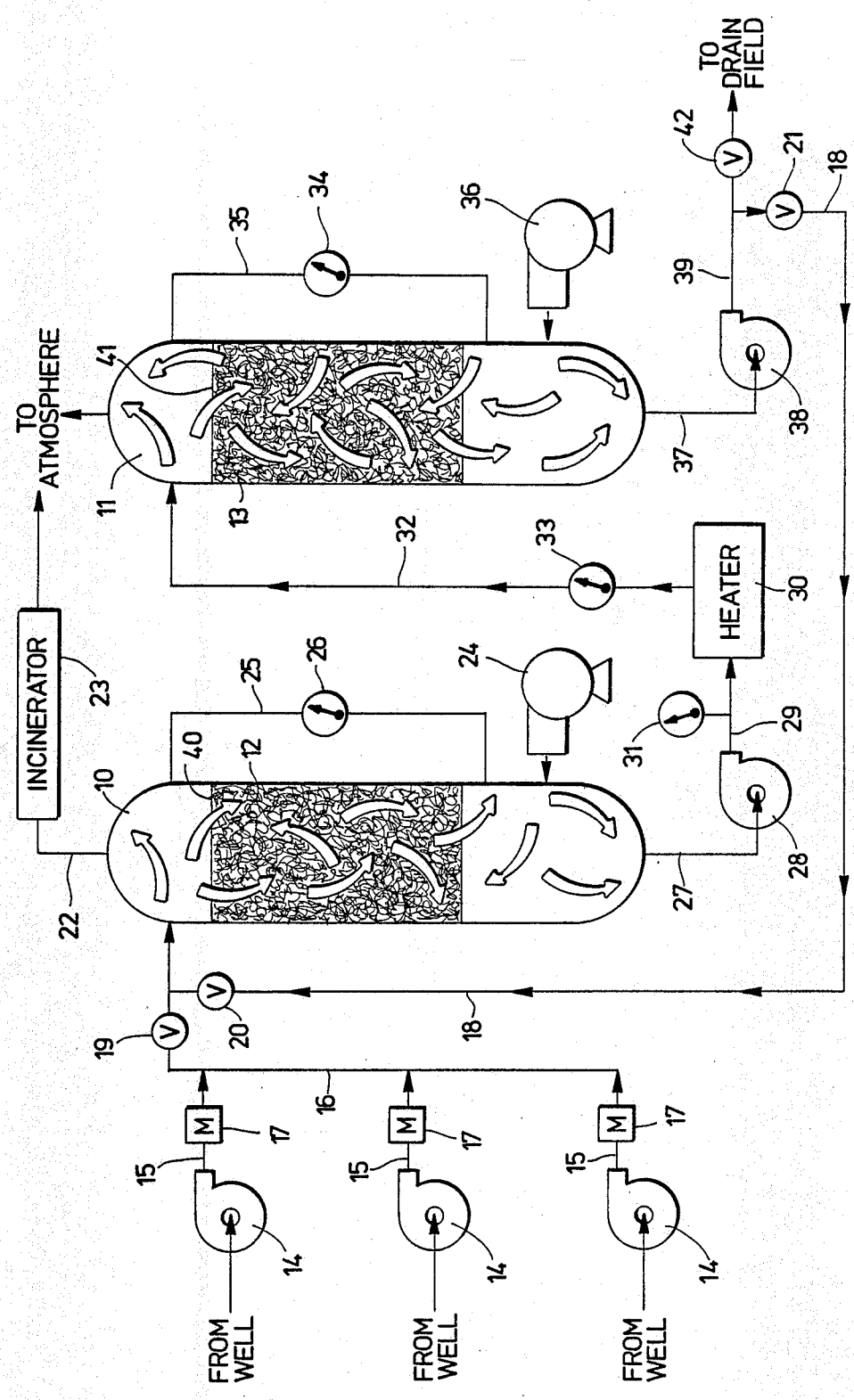

METHOD FOR REMOVING A SLIME DEPOSIT FROM PACKING MATERIAL INSIDE A TOWER

BACKGROUND OF THE INVENTION

This invention relates to a method for removing slime that deposits on packing material inside a tower. More particularly, the invention concerns removal of slime deposits on tower packing material in which the slime is created by air stripping of groundwater to remove organic contaminants.

A major problem today is the contamination of groundwater by hydrocarbons, such as gasoline, benzene, toluene, or xylene that leak out of underground storage tanks. Groundwater can also be contaminated by chlorinated solvents, such as trichloroethylene, trichloroethane, perchloroethylene, and methylene chloride, which are used in degreasing operations and then dumped into open pits in the ground. Another way that the water in underground aquifers becomes contaminated is from petroleum hydrocarbons that are dumped on top of the ground near oil and gas well sites.

One way to remove organic impurities from groundwater is by a technique referred to as air striping. In a typical air-stripping process, the contaminated water is passed through a tower containing a packing material. As the water moves through the packing material, it is contacted by air, at ambient temperature and pressure, that is moving counter-currently to the water. The air strips a major portion of the organics from the water and this stream may be passed through a catalytic incinerator, or other means which converts the organics to compounds that can be safely discharged into the atmosphere. The decontaminated water stream is discharged from the tower according to an acceptable procedure.

Although air stripping is a useful technique for removing organic contaminants from groundwater, it has a major drawback. The oxygen in the air provides an excellent environment for bacterial growth, which forms as a slime deposit on the packing material. In a fairly short time, usually only a few weeks, the slime deposit will increase the pressure drop through the system enough to make the process ineffective.

A common method for inhibiting the formation of the slime deposits is to chemically treat the contaminated water before it is introduced into the tower. For example, in one technique acidic or alkaline compounds are added to the water to control the pH level. Another technique involves adding oxidizing biocides to the water, such as chlorine, chlorine dioxide, chlorine donors, and ozone. Although the chemical treatment is reasonably effective, it has several disadvantages. These include the cost of equipment required to store and handle the chemicals safely, the necessity of adding chemicals to clean water, and the complex operations involved in pH control.

SUMMARY OF THE INVENTION

The invention relates to a method for removing a slime deposit that accumulates on packing material contained inside a vapor-liquid contact tower. In this operation a liquid phase containing water and certain volatile components that are dissolved in the water are introduced into a tower containing a packing material. An air phase is also introduced into the tower, and the liquid phase and air phase flow through the packing material countercurrent to each other. As the air phase contacts the liquid phase, it "strips out" a major portion of the volatile components phase, to provide a decontaminated water phase. During the stripping operation, the oxygen in the air initiates bacterial growth that produces the slime deposit on the packing material.

The volatile components phase is discharged from the tower, and periodically, the process operator takes a reading of the pressure differential that exists across the packing material. The pressure readings enable him to determine a point at which the slime deposit should be removed. When this point is reached, the flow of the liquid phase into the tower is shut off and the decontaminated water phase is passed into a heater means, to heat it to a temperature of from about 150° F. to 200° F. The heated water phase is then recycled back into the tower and through the packing material. As the heated water moves through the packing material, it destroys the slime deposit and dislodges it from the packing material. The destroyed material is then carried out of the tower along with the water phase.

DESCRIPTION OF THE DRAWINGS

The single FIGURE of the drawing is a schematic illustration of one embodiment of a slime-removing system according to this invention.

DESCRIPTION OF THE INVENTION

In the description that follows, the term liquid phase refers to a liquid that includes a water phase and a volatile components phase. The volatile components phase, as used herein, means compounds having a relative volatility to water that is greater than 1.0 when they are dissolved in water. Examples of these components include hydrocarbons, such as gasoline, benzene, toluene, or xylene, and chlorinated solvents, such as trichloroethylene, trichloroethane, perchloroethylene, or methylene chloride, and mixtures thereof.

Referring to the drawing, the slime-removing system illustrated therein includes two conventional packed towers, as indicated by numerals 10 and 11. A conventional packing material is used in each tower, as indicated by numeral 12 (for tower 10) and numeral 13 (for tower 11). Packing materials that may be used include those fabricated of plastic resins, such as polypropylene; metals, such as steel, stainless steel, nickel, and nickel alloys, ceramics, and glass. Water contaminated with the organic impurities described above is drawn from underground wells by one or more pumps. Each pump, indicated by numeral 14, is connected by a discharge line 15 into a header line 16, and line 16 connects into tower 10 above the packing 12.

A metering device 17 is installed in each of the lines 15, to measure the flow rate of water delivered by each pump into the header line 16. A recycle line 18 connects into the header line 16 near the point where the header line connects into tower 10. A valve 19 in header line 16 can be used to shut off flow of water into tower 10. Shut off valves 20 and 21 are also installed in the recycle line 18.

At the top of tower 10 is a vapor discharge line 22, with an incinerator 23 being installed in this line. Air, at ambient temperature and slightly elevated pressure, is blown into tower 10 from a blower 24, positioned near the bottom of the tower. A pressure line 25 is connected into the tower at a point above the packing material 12, and at a point below the packing. Installed in this line is a differential pressure gauge 26, for reading the pressure differential across the packing 12. At the bottom of tower 10 is a discharge line 27, which connects into the intake side of a pump 28. Another line 29 connects the discharge side of the pump into a heater device 30.

A thermometer 31 in line 29 provides means for reading the temperature of liquid passing through this line into the heater 30. The heater is also connected into the top of tower 11 by a line 32, and the temperature of the liquid passing through this line can be monitored by another thermometer 33. In tower 11 the pressure differential across the packing material 13 is monitored by a pressure gauge 34 in pressure line 35. Air, as a stripping vapor, is blown into tower 11 by a blower 36. A discharge line 37 connects the bottom of tower 11 into the intake side of a pump 38. Water that has been decontaminated is discharged from pump 38 through a line 39, that carries it to a disposal point, such as a drain field (not shown). As explained in more detail later in this description, the decontaminated water is also used to remove slime deposits on the packing material in the towers 10 and 11.

OPERATION

The invention can be illustrated by describing an operation in which hot water is used to destroy and remove slime deposits on the packing material in a stripping tower. At the start of the operation, water contaminated with organic impurities, such as the compounds described earlier, is drawn from an underground formation by the pumps 14. In the embodiment illustrated in the drawing, three pumps are used to draw the water out of the ground. But the number of pumps used for this step is not critical; one or more may be used.

From the pumps 14, the contaminated water is pumped through the discharge lines 15 into the header line 16. As the water moves through the discharge lines, the flow rate can be monitored by the flow meters 17. The flow rate is not a critical factor in the slime-removing step, and it will depend on several conditions, such as the size of the towers, the type of packing material used, and the like. As the contaminated water enters the tower 10, from line 16, it falls onto a distributor device 40. From the distributor, the water falls in a substantially uniform pattern downwardly through the packing material 12. At the same time, air at ambient temperature and slightly elevated pressure is blown into tower 10 by blower 24.

As the air moves upwardly through the packing material 12, it strips most of the organic impurities out of the water stream. As described earlier, the organic impurities make up a separate phase referred to as a volatile components phase. Since the concentration of the volatile components is too high to discharge them directly into the atmosphere, this stream is directed from tower 10 into a catalytic incinerator 23 through the vapor discharge line 22. As these components pass through the incinerator, they are oxidized mostly to $CO_2$ and water and this stream is discharged into the atmosphere.

Inside tower 10, the partially decontaminated water phase collects in the bottom of the tower and is pumped out of the tower by the effluent pump 28 through the discharge line 27. From pump 28, the water stream passes through line 29 and heater 30 and is delivered into the top of tower 11 through the inlet line 32. The water entering tower 11 falls onto a distributor device 41. In the same manner as described for tower 10, the water falls in a substantially uniform pattern downwardly through the packing material 13. At the same time, air at ambient temperature and pressure is blown into tower 11 by blower 36.

As the air from blower 36 moves upwardly through the packing material 13, it strips out the small amount of volatile components that remain in the water phase. The concentration of the impurities in the volatile components phase is low enough so that this phase can be safely discharged directly into the atmosphere from tower 11, as indicated in the drawing. The clean water that remains after this stripping step, is drawn out of tower 11 by pump 38 through the discharge line 37. The pump then delivers the water through the outlet line 39 to a drain field, from which it can seep back into the underground aquifers. A valve 42 in line 39 provides means for shutting off the water flow to the drain field.

Another step in the decontamination process of this invention is removing the slime that deposits on the packing material. As a part of this sequence, the process operator frequently reads the differential pressure gauge 26 in line 25, and the differential pressure gauge 34 in line 35, to determine the pressure differential across the packing sections 12 and 13. The actual pressure differential will depend on factors such as the type and size of the packing being used, the height of the packing section, and the flow rate and volume of the water and air phases. In the practice of this invention, a typical pressure reading could be, for example, 5.5 inches water column. Using this figure as a base value, it was found that a 20% increase in the pressure differential could indicate that slime deposits on the packing material had reached a point where the slime should be removed to prevent the tower from plugging off.

When the pressure differential reaches about 6.0 to 6.5 inches water column, therefore, the slime removal sequence is started. The first step is to shut off valves 19 and 42, open valves 20 and 21, turn off the blowers 24 and 36, and turn on heater 30. When valves 20 and 21 are open, pump 38 pumps the clean water back through the recycle line 18 and into tower 10. From tower 10, pump 28 directs the water into heater 30, which heats it up to a temperature of from about 150° F. to 200° F. A preferred operating range is from about 175° F. to 185° F. The hot water is then pumped back into tower 11, through line 32, and as it moves down through the packing material, it destroys the bacteria that cause the slime deposit on the packing.

The blowers 24 and 36 are turned off. The water is then heated to the desired temperature and pumped in a continuous cycle through both towers until the slime deposits have been removed from the packing. The temperature of the circulating hot water is monitored by reading thermometer 31 in the pump discharge line 29, thermometer 33 in line 32, and another thermometer (not shown) located in a remote control panel (not shown). The hot water is recycled through each of the towers for about 60 minutes to 90 minutes, or for a longer or shorter time. Once the process operator learns from experience how long it takes the circulating hot water to remove the slime deposit, he can modify his time schedule accordingly.

Following the slime removal step, the operator turns off the heater 30, closes valves 20 and 21, opens valves 19 and 42, and turns on the blowers 24 and 36. This allows the pumps 14 to resume pumping the contaminated groundwater through the system to remove the organic impurities. At this point, the pressure differential should drop back to about 5.5 inches water column. If the pressure drop is still too high, the operator will repeat the step of recycling hot water through the towers.

In the drawings of the present invention, the contaminated water is cycled through two stripping towers to remove organic impurities. But in actual practice, one tower, or several towers can be used.

The invention claimed is:

1. A method for destroying and removing a slime material deposit that accumulates on packing material contained inside a vapor-liquid contact tower, comprising the steps of:

introducing a liquid phase that includes a water phase and a volatile components phase into a tower containing a packing material, and flowing the liquid phase through the packing material;

introducing an air phase into the tower and flowing the air phase through the packing material in a direction countercurrent to the flow of the liquid phase;

removing a major portion of the volatile components phase from the liquid phase, to provide a decontaminated water phase;

discharging the volatile components phase from the tower;

accumulating a slime material deposit on the packing material during the flow of the liquid phase and air phase through the packing material;

taking periodic readings of a pressure differential that exists across the packing material inside the tower, to determine a point at which the slime deposit should be removed from the packing material;

stopping the flow of the liquid phase and air phase into the tower;

passing the decontaminated water phase through a heater means and heating said water phase to a temperature of from about 150° F. to 200° F.;

recycling the heated, decontaminated water phase from the heater means back into the tower and through the packing material, to destroy the slime material deposit;

removing the destroyed slime material from the packing material; and discharging the destroyed slime material from the tower.

2. The method of claim 1 which includes the steps of:
taking additional readings of the pressure differential across the packing material, to determine a point at which most of the slime deposit material has been removed from the packing material; and
resuming the flow of the liquid phase and air phase into the tower.

3. The method of claim 1 in which the water phase is heated to a temperature of from about 175° F. to 190° F.

4. The method of claim 1 in which the slime material deposit is formed by materials present in the liquid phase, the said materials being selected from the group consisting essentially of aerobic microorganisms, anaerobic mioroorganisms, organic debris, and inorganic debris.

5. The method of claim 1 which includes the steps of:
introducing the heated, decontaminated water phase into a second tower containing a packing material, said water phase containing a residue amount of the volatile components;
flowing the heated water phase containing the residue amount of volatile components through the packing material;
introducing an air phase into the second tower and flowing the air phase through the packing material in a direction countercurrent to the flow of the water phase;
removing most of the residue amount of the volatile components from the heated water phase, to provide a clean water phase;
discharging the residue amount of volatile components from the second tower;
discharging part of the clean water phase from the second tower; and
recycling part of the heated, clean water phase back into the first tower and through the packing material to destroy the slime material deposit and remove it from the packing material.

6. The method of claim 1 in which the packing material is fabricated of materials selected from the group consisting of plastic resins, metals, ceramics, and glass.

* * * * *